Nov. 14, 1939.   A. B. WILSON   2,179,583
REVERSIBLE ROAD RAKE
Filed June 23, 1937   2 Sheets-Sheet 1

INVENTOR:
Arthur B. Wilson,
BY Bodell & Thompson
ATTORNEYS.

Nov. 14, 1939.  A. B. WILSON  2,179,583
REVERSIBLE ROAD RAKE
Filed June 23, 1937  2 Sheets-Sheet 2
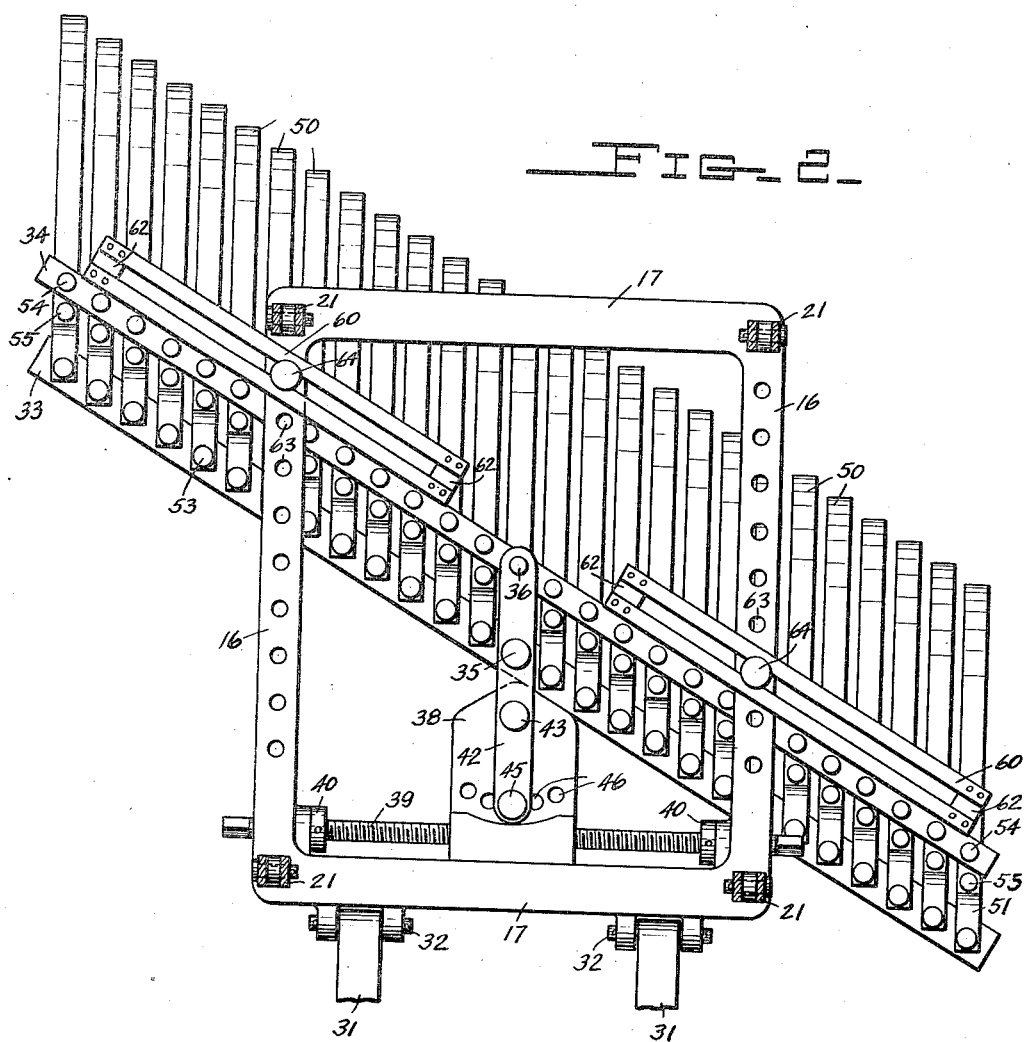
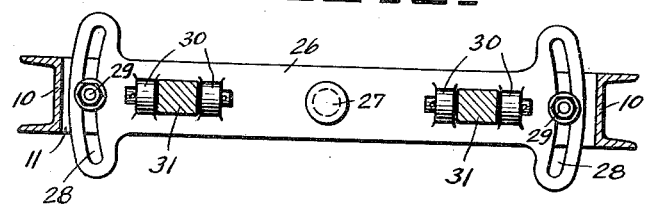
INVENTOR:
BY Arthur B. Wilson,
Bodell & Thompson
ATTORNEYS.

Patented Nov. 14, 1939

2,179,583

UNITED STATES PATENT OFFICE 2,179,583

REVERSIBLE ROAD RAKE

Arthur B. Wilson, Fayetteville, N. Y.

Application June 23, 1937, Serial No. 149,936

6 Claims. (Cl. 55—17)

This invention relates in general to road conditioning machines, and more particularly to a road rake employed to grade and distribute loose materials, such as stones, gravel, etc., on the road.

The invention has as an object a road rake embodying a particularly efficient and economical construction which permits the rake to be readily adjusted from one angular position to another relative to the line of draft of the vehicle from which the rake is suspended.

The invention further includes structure operable to effect adjustment of the raking unit transversely of the frame of the vehicle.

The invention has as a further object a road rake embodying a construction by which the teeth of the rake may be maintained in alinement or parallel with the line of draft of the vehicle, regardless of the angular position to which the raking member is adjusted, and further incorporates means by which the spacing between the teeth may be adjusted to effect different grading of the material.

The invention consists in the novel features and in the combinations and constructions hereinafter set forth and claimed.

In describing this invention, reference is had to the accompanying drawings in which like characters designate corresponding parts in all the views.

Figure 2 is a top plan view of the rake.

Figure 3 is a view taken on line 3—3, Figure 1.

Figure 1:
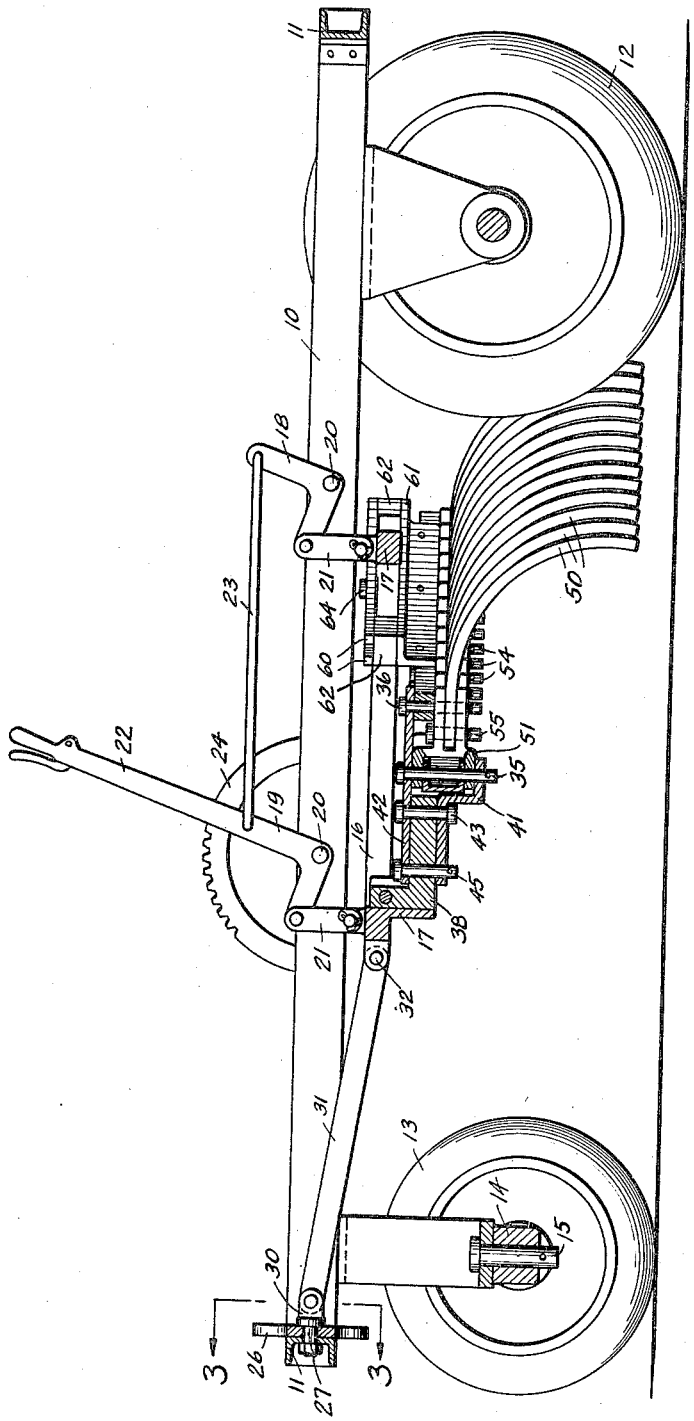
Figure 1 is a lengthwise, sectional view of a road rake embodying my invention, and a vehicle from which the rake is suspended with parts shown in elevation.

It has become common practise to condition certain roads, not permanently paved, by loosening the surface material of the road, collecting the loosened material, grading the same and redistributing it. Many roads formed of crushed stone, gravel, rock shale, natural soils etc., require frequent reconditioning, due to the fact that the finer material of which the road is constructed sifts or moves downwardly and blows away in the form of dust, and the coarser material works upwardly through the surface of the road. This reconditioning is usually done by loosening the surface material of the road by a device known as a scarifier, which is followed by a scraper which functions to carry the loosened material either to one side or the center of the road, and to smooth over the surface of the road. The scraper is frequently followed by a road rake which collects the material transposed by the scraper and redistributes it over the surface of the road.

An important function of the rake also is to grade the loosened material in place while being redistributed. That is, the teeth of the rake are so spaced as to permit stones of a predetermined size to pass through or between the teeth of the rake, and the larger stones are carried to the end of the rake and discharged in a windrow.

The scarifier, scraper and rake may be suspended from separate vehicles, or all three may be suspended from the same vehicle. These devices are of such length as to condition between six and seven feet of the width of the road. It is not practical to make these units of greater length, or of such length as to condition the entire width of the road, due to the excess power required to propel them, and also due to the fact that it is desirable to so adjust these devices as to establish a crown for the road. Also, in reconditioning dirt and stone roads, it is not necessary, nor desirable, that the road be entirely closed to traffic and accordingly, one side of the road is conditioned at a time.

In some instances the scarifier and scraper are of such construction as to permit the vehicle, or vehicles, to be propelled along one side of the road in one direction and the vehicle turned around and propelled along the other side of the road in the opposite direction. However, insofar as I am aware, road rakes have not been constructed so as to permit the vehicle to be used in both directions on the road, but are so constructed as to necessitate the vehicle being returned to the starting point and the other side of the road conditioned by moving the vehicle in the same direction as in the first conditioning operation. This not only entails an appreciable waste of time, but results in increased traffic hazards due to the fact that one half of the road surface must be reconditioned by the road machine travelling on the left hand or wrong side of the road, meeting traffic directly and in the same lane. In some sections of the country machines are not permitted to do so. Also, the movement of the machine in the same direction on the opposite side of the road results in the discharge of the graded material or larger stones on the same side of the vehicle as during the conditioning of the opposite side of the road. For example, if the rake is set to discharge the larger stones to the center of the road in conditioning one side of the same and the device is propelled in the same direction on the opposite side of the road, the stones will be discharged to the side of the road. Frequently it is desired to discharge the larger stones in a row in the center of the road from which they are subsequently collected and crushed to finer material to be redistributed on the road surface. Where it is not desired to collect the larger stones, it is desirable then that they should be discharged along the sides of the road.

An important feature of my invention is a rake construction by which the angular position of the rake can be conveniently reversed, thus permitting the rake to be propelled in the opposite direction on the opposite side of the road, and to discharge the larger material either in the center of the road, or to the side of the road.

The rake may be suspended from any suitable type of vehicle, as for example the vehicle shown in Figure 1 which comprises a rectangular frame having side members 10 and end members 11. The rear end of the frame is supported by a pair of wheels 12, and the forward end by wheels 13 mounted upon an axle 14 pivotally secured to the front end of the frame as by pin 15. It will be understood that the vehicle may be of any suitable size or construction, either self propelled or equipped with a suitable draft gear to be drawn or pushed by a tractor or truck, or the like.

The rake proper, as here shown, comprises a rectangular frame member having side members 16 and end members 17. The frame member of the rake is suspended beneath the frame of the vehicle by means operable to adjust the rake vertically toward and from the frame of the vehicle. The rake suspension mechanism is preferably such as to maintain the sides 16 of the frame member parallel with the sides 10 of the frame of the vehicle, but to permit individual vertical adjustment of the sides of the frame member of the rake. As here shown, the means for suspending the frame member of the rake comprises a pair of angle levers 18, 19, pivoted to each side member 10 of the frame of the vehicle, as at 20. The forwardly extending arms of the levers 18, 19 are connected to the side members 16 of the rake frame by links 21. The angle lever 19 is formed with an elongated arm in the nature of an operating handle 22, and is connected to the angle lever 18 by link 23. The handle 22 is provided with means cooperable with the quadrant 24 to fixedly secure the handle 22 in adjusted position.

The adjacent side of the rake frame member is raised or lowered by movement of the handle 22, as clearly appears from Figure 1. The front end member 17 of the rake frame is connected to the vehicle by a suitable draft gear which, as here shown, comprises a member 26 extending transversely of the front cross member 11 of the vehicle frame, and is pivotally connected thereto as at 27. The ends of the member 26 are provided with arcuate slots 28 to receive bolts 29 extending through the end member 11 of the vehicle frame. The member 26 is provided with spaced apart bosses 30 adjacent each end thereof to pivotally receive the ends of the draw bars 31, the opposite ends of which are pivotally connected to the forward end of the rake frame as by pins 32. This arrangement permits vertical adjustment of the rake frame member and also transfers angular adjustment of the same.

The rake structure further includes a pair of bars 33, 34, pivotally mounted intermediate their ends to the frame member on pins 35, 36. The bars 33, 34 extend transversely of the frame member in spaced apart parallel relationship. Preferably, instead of being pivoted directly to the frame member, the bars 33, 34 are pivotally mounted on a supporting member, here shown in the nature of a block 38 adjustable transversely of the frame member on screw 39, the ends of which extend through the sides 16 of the frame member and are formed to receive a crank or similar tool, whereby the screw 39 may be conveniently rotated from either side of the machine. Axial movement of the screw is prevented by collars 40 secured to the screw adjacent the inner surface of each side member 16 of the frame member. Straps 41, 42 are pivotally secured to the lower and upper sides of the supporting member 38 as by pin 43. The straps 41, 42 extend rearwardly, and the bar 33, which is here shown as of channel formation, is pivoted between the straps on pin 35, and the rear bar 34 is pivoted to the upper strap 42 by pin 36. The forward ends of the straps 41, 42 are provided with apertures to receive pin 45. This aperture and pins 35, 36 and 43 are arranged in alinement, and the supporting member or block 38 is formed with a plurality of apertures 46 to receive pin 45, whereby the straps 41, 42 may be adjusted about the pivot 43 and secured in adjusted position by pin 45.

The rake teeth 50 are pivotally secured at their upper ends to the bars 33, 34 and extend rearwardly and downwardly therefrom toward the surface of the road. Preferably, the teeth 50 are not pivotally secured directly to the bars 33, 34, but are detachably supported by tooth holders 51 which are bifurcated at one end to receive the bar 33, and which are slotted at the opposite end to receive the ends of the teeth 50.

The forward ends of the tooth holders 51 are pivotally secured to the bar 33 by pins 53, the pin 35 serving this function for the centrally located tooth holder. The rear ends of the tooth holders are pivotally secured to the bar 34 by pins 54, and the pin 36 also serves this function in regard to the centrally located tooth holder. The pins 36, 54 extend through the slotted rear end portion of the tooth holders and through the teeth. The forward ends of the teeth are secured by pins 55. In the event one of the teeth 50 should become bent, or broken, it is readily removable from the tooth holder by removing the pins 54, 55, or in the case of the central tooth, by removing the pins 36, 55.

From the description thus far, it will be apparent that when the pin 45 is in the centrally located aperture 46 of the supporting member or block 38, the teeth 50 are maintained in alinement with the draft or pull of the vehicle. This is particularly desirable to avoid breaking or bending of the teeth. If the teeth, for example, should extend at right angular relationship to the bars 33, 34, they would extend in angular relationship to the draft of the vehicle which would effect considerable side strain or twist on the teeth. As previously stated, an important function of the rake is to grade the loosened material, and this grading depends upon the spacing between the teeth. With the structure described, this spacing can be conveniently varied, it being only necessary to remove the pin 45 and move the straps 41, 42 in register with another one of the holes 46 in the supporting block 38 and reinsert the pin 45. This adjustment effects the parallelogram movement of the bars 33, 34, resulting in a slight pivotal movement of the teeth 50 relative to the bars and accordingly, varies the distance between the lower ends of the teeth. This feature is of importance where the rake is used to distribute different materials. For example, crushed stone and gravel.

It will be understood that suitable mechanism may be incorporated in the structure to effect pivotal movement of the bars 33, 34 to reverse the position of the rake. However, it is only necessary to grasp either end of the rake and swing the same manually when the frame member is elevated to bring the teeth 50 out of contact with the road material.

As here shown, the ends of the rake are supported by spaced apart guide members 60 secured to each end of the bar 34 by angle brackets 61. The ends of the guide members 60 are spaced apart from the brackets 61 by blocks 62, the spacing being sufficient to receive the side members 16 of the frame of the rake. The sides 16 are provided with a plurality of apertures 63 to receive pins 64, the function of which is to hold the rake in adjusted position. The pins 64 are readily removable to permit adjustment of the rake in the desired position.

The rake may be suspended from the under side of the frame of the vehicle, or from the ends thereof, or to one side of the vehicle, it being necessary only to provide sufficient room to permit the rake to be adjusted to reverse position.

What I claim is:

1. The combination of a vehicle and a reversible road rake suspended beneath the frame of the vehicle, said rake comprising a frame member, means carried by the frame of the vehicle and connected to said frame member of the rake and operable to move the rake toward and from said vehicle and to maintain the sides of said frame member parallel with the sides of the vehicle frame during such movement, a pair of bars pivotally mounted intermediate their ends to said frame member and extending transversely thereof in spaced apart parallel relationship, said bars being adjustable about said pivots to assume angular relationship relative to said frame member, a plurality of teeth pivotally connected at like ends to one of said bars and extending rearwardly and downwardly toward the road, said teeth being also pivotally connected intermediate their ends to said other bar, and means carried by the frame member and cooperable with said bars to maintain the same in adjusted position.

2. The combination of a vehicle and a reversible road rake suspended from the frame of the vehicle, said rake comprising a frame member, means carried by the frame of the vehicle and connected to said frame member of the rake and operable to move the rake toward and from said vehicle, a supporting member carried by said frame member, a pair of bars pivotally mounted intermediate their ends on said supporting member and extending transversely of said frame member in spaced apart parallel relationship, said bars being adjustable about their pivots to assume angular relationship relative to said frame member, a plurality of teeth pivotally connected at like ends to one of said bars and extending rearwardly and downwardly toward the road, said teeth being also pivotally connected intermediate their ends to said other bar, and means carried by the frame member and cooperable with said bars to maintain the same in adjusted position, and means for adjusting said supporting member transversely of said frame member.

3. The combination of a vehicle and a reversible road rake suspended beneath the frame of the vehicle and being adjustable toward and from the same, said rake comprising a rectangular frame member, a supporting member carried by said frame member and being adjustable transversely thereof, a pair of bars pivotally mounted intermediate their ends on said supporting member and extending in spaced apart parallel relationship transversely of said frame member, a plurality of teeth pivoted at like ends to one of said bars and being pivotally connected intermediate their ends to the other bar, the pivot points of said bars and teeth being arranged in alinement with the draft of the vehicle, and said supporting member being adjustable to shift said pivot points of the bars and teeth in angular relationship with the draft of the vehicle, guide members carried by one of said bars and being cooperable with the sides of said frame member to support the ends of said bars, and means carried by said frame member and cooperable with said guide members for maintaining said bars in adjusted position.

4. The combination of a vehicle and a reversible road rake suspended beneath the vehicle, said rake comprising a frame having spaced apart side members, means carried by the vehicle and connected to said frame of the rake and operable to move the rake toward and from the vehicle, a supporting member carried by the frame of the rake and being movable transversely thereof between said side members, a pair of bars pivotally mounted intermediate their ends to said supporting member and extending transversely of said frame in spaced apart parallel relationship, said bars being adjustable about their pivots to assume different angular positions relative to said frame, a plurality of teeth pivotally connected at like ends to one of said bars and extending rearwardly and downwardly toward the road, said teeth being also pivotally connected intermediate their ends to said other bar, and means cooperable with said bars and the side members of said frame to support the end portions of said bars during pivotal movement of the same.

5. The combination of a vehicle and a reversible road rake suspended beneath the vehicle, said rake comprising a frame having spaced apart side members, means carried by the vehicle and connected to said frame and operable to move the same toward and from the vehicle, a supporting member carried by the frame and arranged between the side members thereof, a pair of bars pivotally mounted intermediate their ends to said supporting member and extending transversely of said frame in spaced apart parallel relationship, a plurality of teeth pivotally connected at like ends to one of said bars and pivotally connected intermediate their ends to the other bar, and said teeth having rearwardly depending earth engaging rear portions, said bars being shiftable about their pivots to assume different angular positions relative to the frame of the rake, and means cooperable with said bars and the side members of said frame to support the ends of the bars during such pivotal movement and to maintain said bars in adjusted position.

6. The combination of a vehicle and a reversible road rake attached to the vehicle, said rake comprising a frame having spaced apart side members, a pair of bars pivotally mounted intermediate their ends to said frame, said pivots being arranged between said side members, means cooperable with one of said bars and the side members of the frame to support the end portions of said bar during pivotal movement of the same, a plurality of tooth holders pivotally connected adjacent their ends with said bars respectively, and a spring tooth detachably secured at one end to each of said tooth holders and having a rearwardly depending portion.

ARTHUR B. WILSON.